(12) United States Patent
Strohmaier et al.

(10) Patent No.: US 7,318,341 B2
(45) Date of Patent: Jan. 15, 2008

(54) METHOD AND DEVICE FOR MONITORING A SIGNAL

(75) Inventors: Rainer Strohmaier, Stuttgart (DE); Holger Plote, Linz (AT); Andreas Krautter, Steinheim (DE); Stefan Zimmermann, Pfinztal (DE); Michael Walter, Kornwestheim (DE); Juergen Sojka, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,018

(22) PCT Filed: Feb. 26, 2002

(86) PCT No.: PCT/DE02/00704

§ 371 (c)(1),
(2), (4) Date: Jun. 19, 2003

(87) PCT Pub. No.: WO02/073011

PCT Pub. Date: Sep. 19, 2002

(65) Prior Publication Data

US 2004/0040285 A1 Mar. 4, 2004

(30) Foreign Application Priority Data

Mar. 14, 2001 (DE) ................. 101 12 138

(51) Int. Cl.
*G01M 15/00* (2006.01)

(52) U.S. Cl. .................................................. 73/118.1
(58) Field of Classification Search ............... 73/23.31, 73/23.32, 116, 117.2, 117.3, 118.1
See application file for complete search history.

(56) References Cited

U.S. PATENT DOCUMENTS

| 5,822,977 | A | 10/1998 | Fukuda et al. |
| 6,234,012 | B1 * | 5/2001 | Lewis et al. |
| 6,363,922 | B1 * | 4/2002 | Romzek et al. ......... 123/568.16 |
| 6,460,400 | B1 * | 10/2002 | Ichikawa .................. 73/23.31 |
| 6,769,246 | B2 * | 8/2004 | Strohmaier et al. ........... 60/297 |
| 7,059,117 | B2 * | 6/2006 | Ripper et al. ................ 60/286 |
| 2003/0154710 | A1 * | 8/2003 | Plote et al. .................. 60/277 |
| 2004/0089061 | A1 * | 5/2004 | Matsunaga et al. ........ 73/118.1 |
| 2004/0129065 | A1 * | 7/2004 | Plote et al. ................ 73/117.3 |

FOREIGN PATENT DOCUMENTS

| DE | 41 31 401 | 11/1992 |
| DE | 199 06 287 | 8/2000 |
| EP | 0 383 187 | 8/1990 |
| WO | WO 99/34187 | 7/1999 |

* cited by examiner

*Primary Examiner*—Eric S. McCall
(74) *Attorney, Agent, or Firm*—Kenyon & Kenyon LLP

(57) ABSTRACT

A method and a device for monitoring a signal, in particular a pressure signal that characterizes the pressure differential at the input and output of an exhaust after-treatment system, are described. Errors are recognized on the basis of the occurrence of oscillations in the sensor signal.

12 Claims, 4 Drawing Sheets

METHOD AND DEVICE FOR MONITORING A SIGNAL

FIELD OF THE INVENTION

The present invention relates to a method and a device for monitoring a signal.

BACKGROUND INFORMATION

In order to be able to meet the stricter emissions limits, for diesel engines, particle filters are used. Particles accumulate in a particle filter during operation of the engine. The quantity of particles deposited in the particle filter increases the back pressure, and can be measured using a differential pressure sensor or two absolute pressure sensors. If a predefined differential pressure threshold is exceeded, the particle filter is regenerated.

During operation of the engine, measuring inaccuracies can occur in the pressure measurements due to deposits of particles, sulfates, and rust, and/or due to leakage in the system. That can result in the loading state of the particle filter no longer being recognized reliably. Consequently a necessary regeneration of the particle filter may be performed too late or not at all, or may result in performance of the regeneration too frequently. Damage to the exhaust after-treatment system and/or in increased fuel consumption may occur.

SUMMARY

According to the present invention, it has been recognized that errors in the area of signal detection and/or errors within the scope of the system may be recognized reliably on the basis of the occurrence of oscillations in the sensor signal. In particular, a procedure is suitable for sensors which detect signals in the exhaust system or in the exhaust after-treatment system. This may involve in particular pressure sensors, temperature sensors, and/or sensors that provide signals which characterize the composition of the exhaust gas. Examples of such sensors are lambda sensors, nitrogen oxide sensors, and hydrocarbon sensors.

Errors are recognized in particular if a variable which characterizes the oscillation amplitude of the signal is outside of a permissible range. It has been recognized according to the present invention that certain signals exhibit pulsations which are caused by the opening and closing of the exhaust valves. These pulsations are damped by an error-free system. If the pulsations exhibit too great an amplitude, this indicates an error which reduces the damping of the pulsations. This may be caused for example by a broken filter. If the pulsations exhibit too small an amplitude, this indicates an error which damps the pulsations more strongly. This may be caused for example by deposits in the exhaust lines. According to the present invention, errors are recognized if the signal exhibits pulsations which are too large or too small.

If the variable which characterizes the oscillation amplitude of the signal is smaller than a threshold value, there is an error which causes a severe damping of the signal. This may be caused for example by deposits in the lines to the sensor.

The threshold value may be specifiable depending on the operating state of the internal combustion engine and/or of the exhaust after-treatment system. That allows provision for the fact that pulsations of different strengths occur in different operating states.

The variable which characterizes the oscillation amplitude of the signal may be determined on the basis of the difference between the signal and the mean signal. In that case, in particular the mean absolute value of the difference between the signal and the mean signal is used as the variable.

Errors may be recognized on the basis of the time pattern of the pressure differential and an exhaust mass flow variable which characterizes the mass flow of the exhaust gas. This may make it possible to recognize reliably various errors, such as an interruption and/or a blockage of the line to the differential pressure sensor.

Such errors may be recognized when the change in the pressure differential and the change in the variable characterizing the mass flow of the exhaust gas assume implausible values.

Sooting up or blockage of the feeder lines to the sensor is recognized if the pressure differential changes too greatly when there is a small change in the mass flow of the exhaust gas. In particular, this error is recognized if the pressure differential rises by more than a threshold value when there is a small increase in the mass flow of the exhaust gas.

This error is also recognized if the pressure differential changes too little when there is a large change in the mass flow of the exhaust gas. This error may be recognized if the pressure differential changes too little when the mass flow of the exhaust gas drops perceptibly by more than a threshold value, i.e., if the absolute value of the change in the pressure differential is smaller than a threshold value.

An interruption of the feeder line may be recognized if too small a differential pressure is present for a first time period. This means that the absolute value of the pressure differential is smaller than a threshold value.

This error is also recognized if too small a differential pressure is present when there is a severe drop in the mass flow of the exhaust gas for a second time period. This means, if the differential pressure briefly assumes too small a value and simultaneously the mass flow of the exhaust gas drops by more than a threshold value.

The present invention is explained on the basis of the example embodiments illustrated in the drawings.

DETAILED DESCRIPTION

Figure 1:
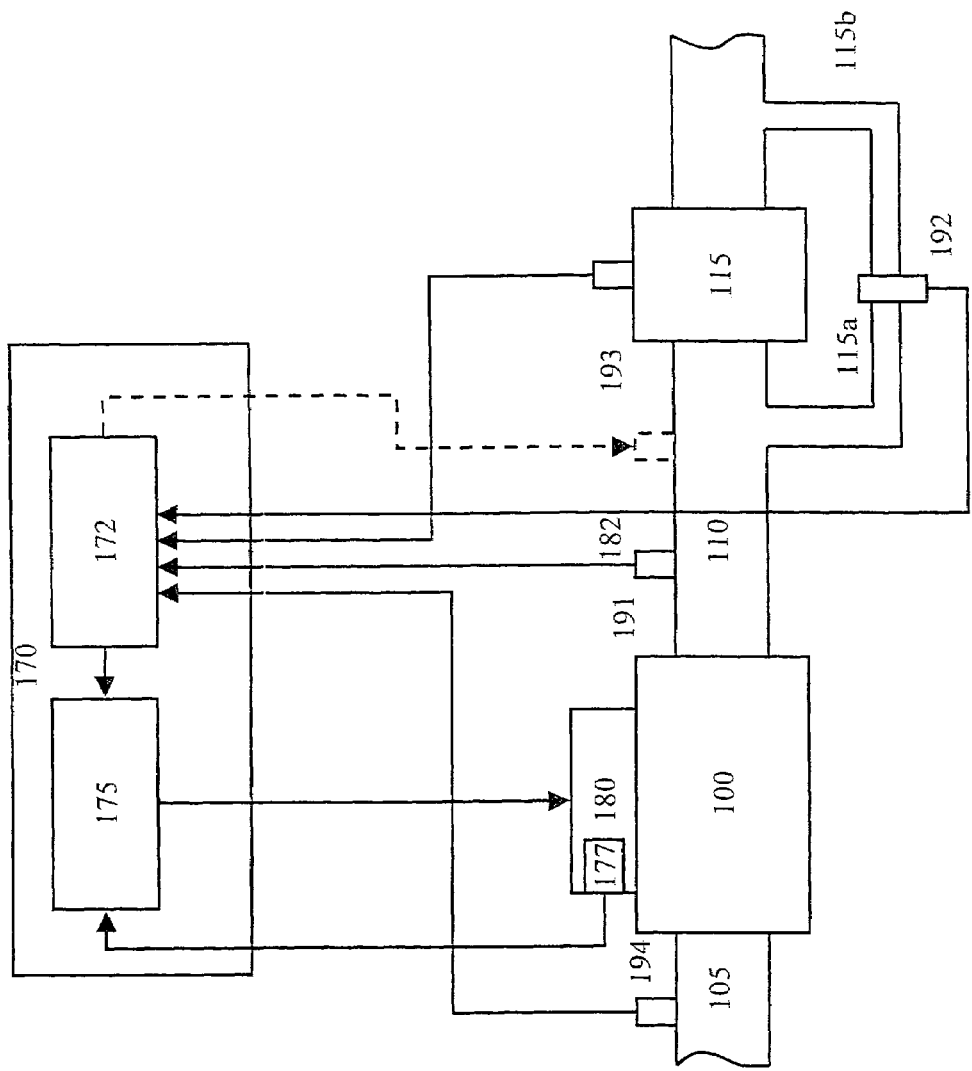
FIG. 1 is a block diagram of an exhaust after-treatment system.
Figure 2:
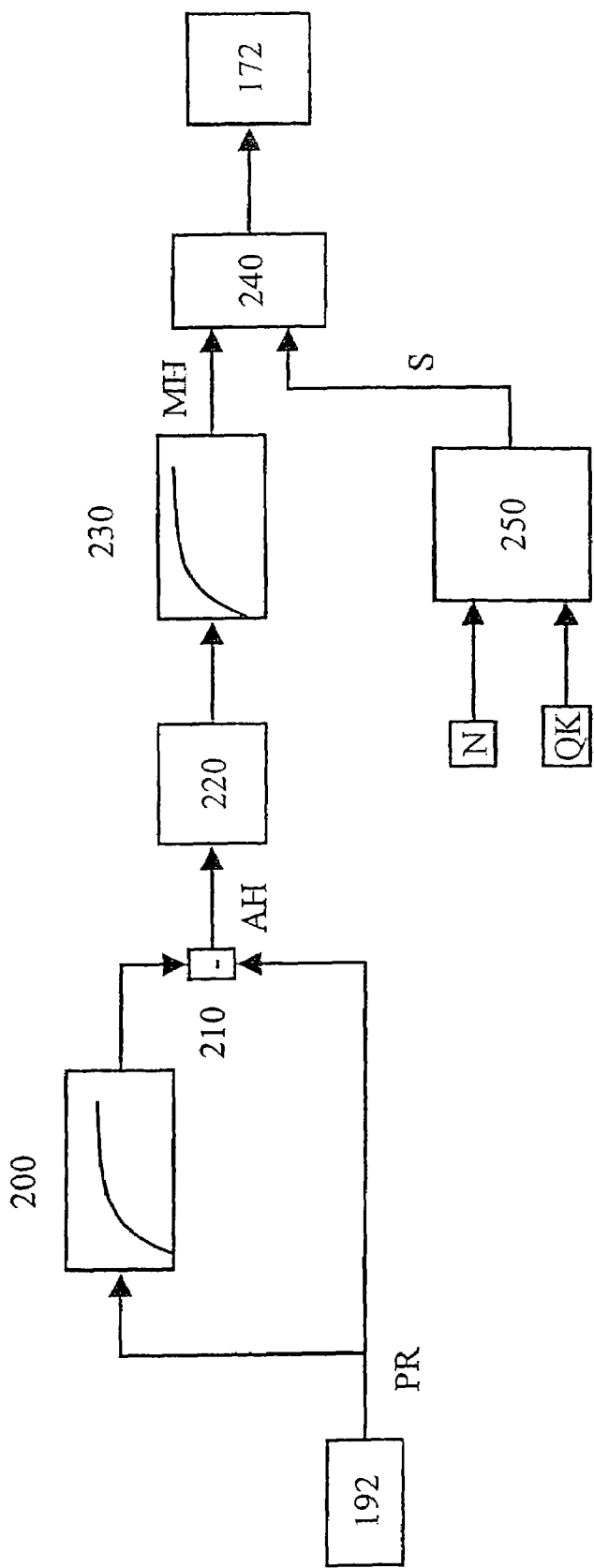
FIG. 2 is a block diagram of the evaluation method for error recognition.

FIG. 1 illustrates the essential elements of an exhaust after-treatment system of an internal combustion engine. The internal combustion engine is designated as 100. Fresh air is fed to the engine through a fresh air line 105. The exhaust gases from internal combustion engine 100 pass through an exhaust line 110 into the environment. The exhaust line contains an exhaust after-treatment system 115. This may be a catalytic converter and/or a particle filter. It is also possible for a plurality of catalytic converters to be provided for different pollutants, or combinations of at least one catalytic converter and one particle filter.

Also provided is a control unit 170, which includes at least one engine control unit 175 and one exhaust after-treatment control unit 172. Engine control unit 175 applies actuating signals to a fuel metering system 180. Exhaust after-treatment control unit 172 applies actuating signals to engine control unit 175, and, in one exemplary embodiment, to an actuating element 182 which is positioned in the exhaust line upstream from the exhaust after-treatment system or in the exhaust after-treatment system.

It is also possible to provide various sensors which furnish the exhaust after-treatment control unit and the engine control unit with signals. For example, at least one first sensor 194 is provided which furnishes signals that characterize the status of the air which is fed to the internal combustion engine. A second sensor 177 furnishes signals that characterize the status of fuel metering system 180. At least one third sensor 191 furnishes signals that characterize the status of the exhaust upstream from the exhaust after-treatment system. At least one fourth sensor 193 furnishes signals that characterize the status of exhaust after-treatment system 115.

Two pressure tapping points are located on the exhaust after-treatment system upstream and downstream from the filter; they are connected via feeder lines 115a and 115b to a differential pressure sensor 192. The pressure differential is measured using one differential pressure sensor or two absolute pressure sensors. This sensor 192 furnishes signals that characterize the status of the exhaust gases downstream from the exhaust after-treatment system.

It is also possible to employ sensors which register temperature values and/or pressure values. In addition, sensors may also be used which characterize the chemical compositions of the exhaust gas and/or the fresh air. These are for example lambda sensors, NOX sensors, or HC sensors.

The output signals of first sensor 194, third sensor 191, fourth sensor 193, and fifth sensor 192 may be applied to exhaust after-treatment control unit 172. The output signals of second sensor 177 may be applied to engine control unit 175. Additional sensors may also be provided, which characterize a signal referring to the driver's intent or other environmental or engine operating states.

The engine control unit and the exhaust after-treatment control unit may constitute one structural unit. However, it is also possible to provide for them to be configured as two control units which are spatially separated from each other.

The following section describes the procedure according to the present invention, using the example of a particle filter which is used in particular with direct-injection internal combustion engines. The procedure according to the present invention is not limited to this application, however; it may also be employed with other internal combustion engines having an exhaust after-treatment system. In particular, it may also be used with exhaust after-treatment systems in which a catalytic converter and a particle filter are combined. It is also employable in systems which are equipped only with a catalytic converter.

On the basis of the existing sensor signals, engine controller 175 calculates actuating signals to apply to fuel metering system 180. The latter then meters the appropriate quantity of fuel to internal combustion engine 100. During combustion, particles may occur in the exhaust gas. These are captured by the particle filter in exhaust after-treatment system 115. In the course of operation, corresponding quantities of particles collect in particle filter 115. This results in an impairment of the functioning of the particle filter and/or the internal combustion engine. Therefore, provision is made for a regeneration process to be initiated at certain intervals, or when the particle filter has reached a certain loading state. This regeneration may also be referred to as a special operation.

The loading state is recognized for example on the basis of various sensor signals. For example, the differential pressure between the input and the output of particle filter 115 may be evaluated. It is also possible to determine the loading state on the basis of different temperature and/or pressure values. Additional variables may also be used to calculate or simulate the loading state. Such a procedure is described in German Published Patent Application No. 199 06 287.

If the exhaust after-treatment control unit recognizes that the particle filter has reached a certain loading state, the regeneration is initialized. Various options are available for regenerating the particle filter. For example, it is possible to provide for certain substances to be fed to the exhaust via actuating element 182, which then cause an appropriate reaction in exhaust after-treatment system 115. These additionally metered substances cause a temperature increase and/or oxidation of the particles in the particle filter, among other things. For example, there may be provision for fuel and/or oxidizing agents to be supplied via actuating element 182.

Usually, provision is made for the loading state to be determined on the basis of various variables. The different states are recognized by comparison with a threshold value, and the regeneration is initiated depending on the recognized loading state.

In such exhaust after-treatment systems, oscillations occur in conjunction with various signals which are detected in particular by sensors in the area of the exhaust after-treatment system; these are also referred to as pulsations. These pulsations are caused by the changes in the pressure of the exhaust gas as the exhaust valves of the individual cylinders open and/or close. These pulsations are correlated with the camshaft frequency. The amplitude of the pulsations is damped by deposits in the pressure lines between exhaust lines 110 and the sensors.

According to the present invention, it has been concluded that it is possible to deduce the condition of the feeder lines from the amplitude of the oscillations of the signals, in particular the pressure signal. Deposits and leakage in the lines may be recognized. In addition to errors in the area of the sensor or in the lines to the sensor, it is also possible to recognize errors in the area of the exhaust system, in particular exhaust after-treatment system 115 and exhaust line 110.

The following section describes the procedure according to the present invention, using the example of differential pressure sensor 192. The procedure according to the present invention is not limited to this application, however; it may also be used with other sensors which are positioned in the exhaust after-treatment system or the exhaust line.

Two pressure tapping points are located on the exhaust after-treatment system upstream and downstream from the filter; they are connected via feeder lines 115a and 115b to a differential pressure sensor 192. The pressure differential is measured using one differential pressure sensor or two absolute pressure sensors. To detect the pulsations, the pressure signal is sampled in a fixed time pattern. The signal may be sampled in a 1 millisecond pattern. The mean value within a given time is generated from raw signal PR using a low pass filter, and is subtracted from the raw signal. That determines the absolute height AH of the pulsations. Next the mean height of the pulsations MH within a given time is determined by generating the absolute value and again low-pass filtering. This value is compared to a threshold value S, which may be specifiable as a function of the operating state of the internal combustion engine. In particular, the threshold value may be specified as a function of the rotational speed of the internal combustion engine and/or the quantity of fuel injected. If the value is lower than this threshold, an error in the pressure lines is deduced.

Signal PR from sensor 192 is conveyed to a mean value generator 200 and to a connecting point 210. At the second input to connecting point 210, the output signal of mean value generator 200 is present. Connecting point 210 applies variable AH, which characterizes the absolute height of the pulsations of signal PR, to an absolute value generator 220.

The output signal of absolute value generator 220 is applied to a low-pass filter 230, which furnishes a signal MH to a comparator 240. Present at the second input of the comparator is a threshold value S from a threshold value specifier 230, to which various operating parameters such as rotational speed N and quantity of fuel injected QK are applied.

Connecting point 210 calculates the difference between the mean value of raw signal PR and raw signal PR. That produces the absolute height of the pulsations. Absolute value generator 220 and a subsequent mean value generator produce a mean value of pulsations MH in a given time. This value is compared by comparator 240 to threshold value S, which may be specified by threshold value specifier 250 as a function of various operating parameters.

If query 240 recognizes that signal MH is within a predefined range, the signal is recognized as permissible and is processed further by controller 172. Alternatively, there may also be provision for signal MH to be checked to determine whether a threshold value dependent on the operating point is exceeded. This makes it possible to also recognize errors when no pulsations occur, which also indicate a defect. A permissible signal may only be recognized when signal MH, which characterizes the pulsations, is smaller than a threshold value S1 and greater than a threshold value S2, i.e., if the signal is within a window.

An error which may occur in the area of the feeder lines to the differential pressure sensor is caused by particles being deposited in the feeder lines. This sooting falsifies the pressure signals and interferes with the recognition of the loading, and thus the controlling of the regeneration procedure. This may result in higher emissions, failure of the entire exhaust after-treatment system, and complete breakdown of the vehicle.

Early recognition of the sooting during operation of the engine makes it possible to respond appropriately to an erroneous pressure signal and to introduce appropriate measures. In particular, it is possible to provide for the loading state to be calculated by other methods, such as a simulation.

According to the present invention, it has been recognized that the differential pressure and the volume flow of the exhaust gas change in a similar manner when there are changes in operating states such as a change of load and/or a change of engine speed. If the time pattern of the differential pressure and of the volume flow of the exhaust gas differs significantly from each other, an error in the system may be assumed. According to the present invention, the signals are differentiated and the dynamic behavior is thereby detected and compared.

An error is recognized according to the present invention when volume flow gradient ÄM is smaller than a negative gradient limit SWMNeg, but pressure gradient ÄDP is greater than associated minimum value SWDPNeg. An error is also recognized when volume flow gradient ÄM is greater than a positive gradient SWMPos and pressure gradient ÄDP is smaller than pre-defined value SWDPPos. In these cases, after interposition of debouncing and under the condition that none of the sensors needed for determining the two input signals exhibits a defect, an error due to sooting and erroneous dynamics is recognized.

Figure 3:
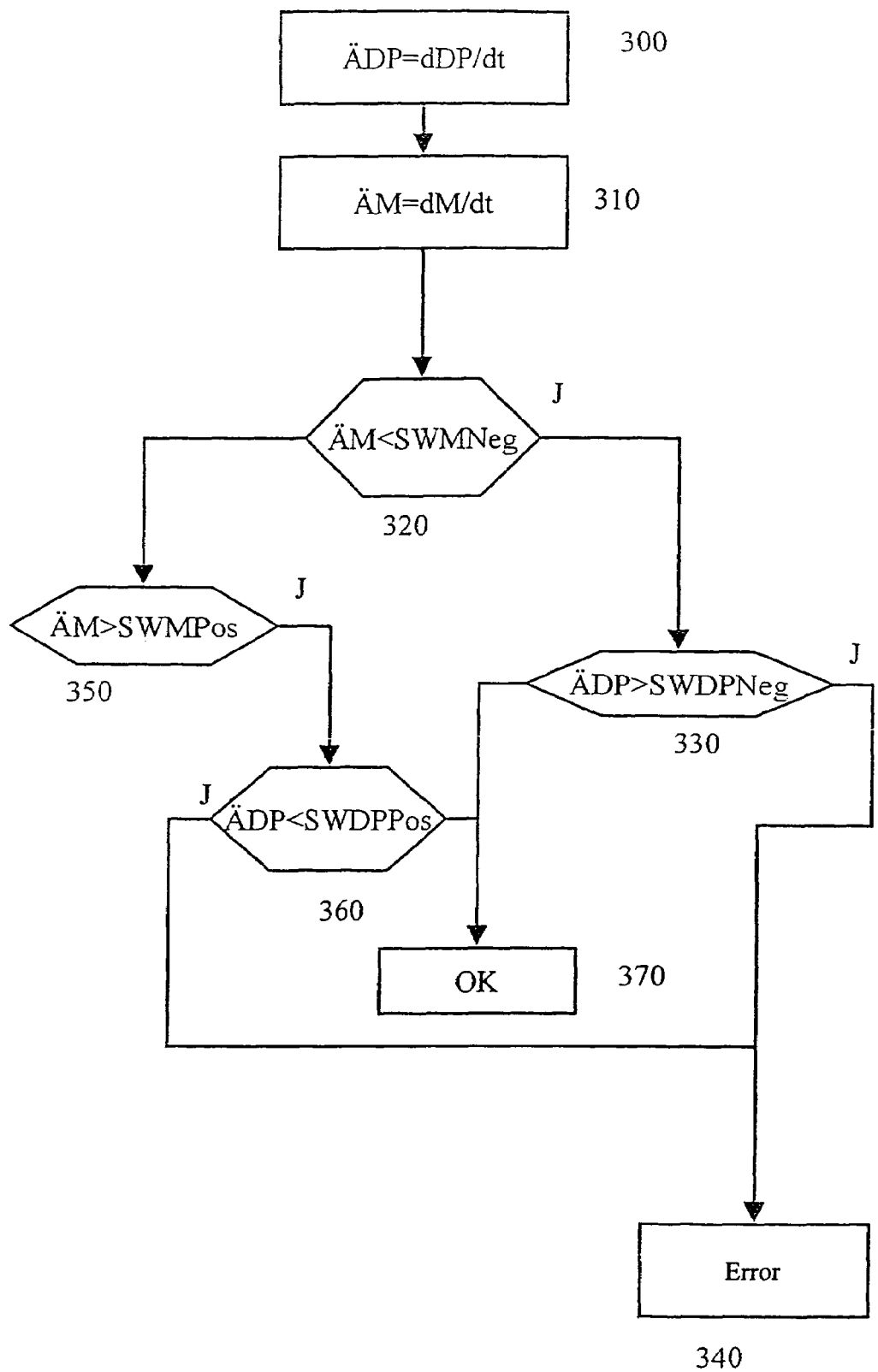
FIG. 3 shows a flow diagram representing a procedure for recognizing an error indicating that a pressure differential changes too little when a mass flow of an exhaust gas increases greatly.

A corresponding procedure is shown in FIG. 3. In a first step 300, gradient ÄDP of the differential pressure, which corresponds to the derivative of differential pressure DP over time, is determined. Then in step 310 change ÄM of the mass flow of the exhaust gas is also determined by taking the differential of exhaust gas volume mass flow M. The exhaust gas mass flow is present as a variable in the control unit, or may be calculated from other operating parameters.

A first query 320 checks whether the change in exhaust gas mass flow ÄM is smaller than negative threshold value SWMNeg. If this is the case, query 330 checks whether the change in differential pressure ÄDP is greater than a negative minimum value SWDPNeg. If this is also the case, then an error is recognized in step 340. In this case an error is recognized if the pressure differential decreases too little when there is a severe drop in the mass flow of the exhaust gas.

If query 320 recognizes that the change in the mass flow is not smaller than threshold value SWMNeg, then query 350 checks whether the change in the mass flow is greater than a positive threshold value SWMPos. If this is the case, query 360 checks whether the change in differential pressure ÄDP is smaller than a positive threshold value SWDPPos. If this is the case, an error is also recognized in step 340.

Queries 350 and 360 recognize errors if the pressure differential changes too little when the mass flow of the exhaust gas increases greatly.

Otherwise, in step 370 an erroneous state is recognized, or the procedures represented in the other figures are worked through. Errors which have already been recognized are not deleted until an error-free condition has been recognized in a new test.

In one example embodiment, queries 320 and 350 may also be worked, though in reverse order. The order in which threshold values SWMPos and SWMNeg are queried is immaterial.

Using the embodiment described below, it is possible to recognize various errors in the area of feeder line 115a or 115b. These feeder lines are usually implemented as hose connections. In real operation, it is possible for these hose connections to become loose, resulting in an erroneous pressure signal. In particular, if feeder line 115a becomes disconnected upstream from the particle filter, recognition of loading is no longer possible. Melting or kinking of the hoses due to the thermal and mechanical loads on the feeder line is also possible.

In particular in view of the high demands for operating reliability and/or the requirements of law, it is not sufficient to check the feeder lines only in conjunction with maintenance service. Using the procedure according to the present invention, it is possible to check the feeder lines and confirm the meaningfulness of the pressure signal while the engine is operating. No additional sensors may be necessary, since the data may be already present in control unit 170.

Using the procedure according to the present invention, two critical error cases may be recognized. An analysis is performed of whether feeder line 115a is intact and the connection between sensor 192 and the exhaust line has not become detached. An analysis is also performed of whether connection 115b is not blocked or kinked, or, if a plastic hose is used, whether it has not melted because of the high temperature. In this case the pressure builds, but is reduced only slowly or not at all when there is a corresponding pressure drop in the exhaust system. These two errors influence the functioning of the load recognition, and thus of the control of the particle filter regeneration process.

Detachment of the hose of feeder line 115a results in a significant drop in pressure at sensor 192. According to the present invention, a corresponding error is recognized if the differential pressure is smaller than a minimum value DPMIN for an extended time. If it is lower than the minimum value for only a short time, an error is recognized if the increase in volume flow at the same time exceeds a limiting value. That is, if the differential pressure is less than the minimum value when there is a great increase in the volume flow. In this case it may be assumed that there is a defect in the pressure equalization in line 115*b*.

Figure 4:
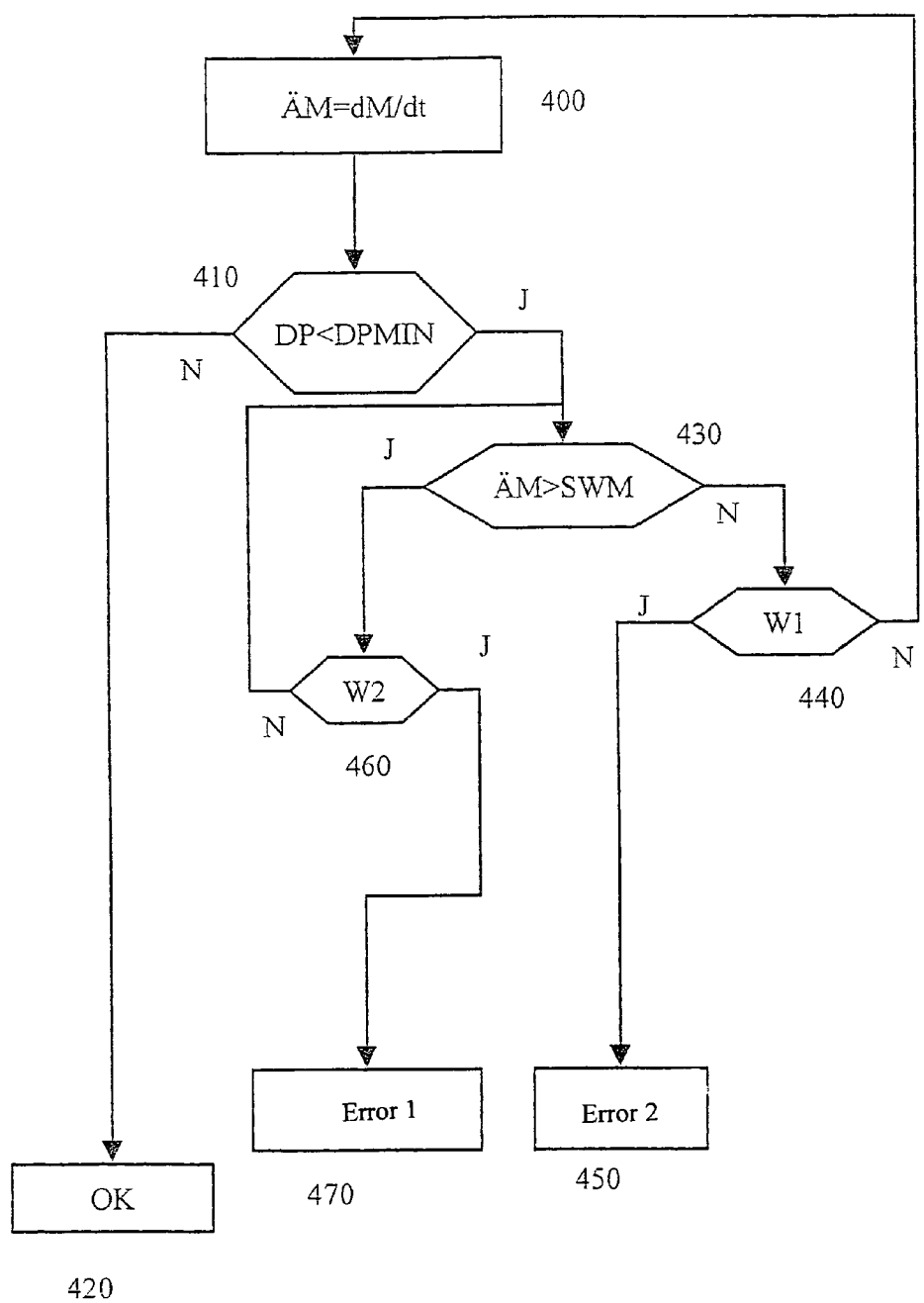
FIG. 4 shows a flow diagram representing a procedure for recognizing an error pertaining to a status of a feeder line.

A corresponding procedure is illustrated in FIG. 4. In a first step 400, the change ÄM in the volume mass flow is calculated by differentiation. Subsequent query 410 checks whether differential pressure DP is smaller than a minimum value DPMIN. If this is not the case, in step 420 the system is recognized as error-free. There may also be provision for error debouncing procedures to be performed in step 420.

If query 410 recognizes that the differential pressure is smaller than minimum value DPMIN, query 430 checks whether change ÄM in the volume flow is greater than a threshold value SWM. If this is not the case, query 440 checks whether a waiting time W1 has passed. If so, error 2 is recognized in step 450. In particular, it is recognized that feeder line 115*a* is faulty. Such an error is present, for example, if the connecting line has become detached from the sensor or from the exhaust line. This error is recognized if too small a differential pressure is present for an extended time W1.

If query 440 recognizes that the waiting time has not yet passed, step 400 takes place again.

If query 430 recognizes that a great increase in the mass flow of the exhaust gas has occurred, then a query 460 checks whether an additional waiting time W2 has passed. If not, step 430 takes place again. If the waiting time has passed, in step 470 an additional error 1 is recognized. This error 1 indicates that line 115*a* is blocked. This error is recognized when a great increase in the mass flow of the exhaust gas is the reason for differential pressure DP being too small.

Waiting time W2 may be significantly shorter than waiting time W1.

What is claimed is:

1. A method of changing an operational mode of an exhaust after-treatment system, comprising:
   monitoring a pressure signal that characterizes at least one of a pressure at an input and output and a pressure differential between the input and output of the exhaust after-treatment system;
   deciding whether to change the operational mode of the exhaust after-treatment system based on the monitored pressure signal, wherein the deciding includes recognizing by a control unit errors on a basis of:
   a first error diagnosis which evaluates an amplitude of oscillations in the pressure signal, and
   a second error diagnosis which evaluates a correspondence over time of the pressure signal and a variable characterizing one of an exhaust-gas mass flow and an exhaust-gas volume flow,
   wherein the exhaust after-treatment system is at least one of a particulate filter and a catalytic converter.

2. The method according to claim 1, further comprising recognizing an error if a variable which characterizes the oscillation amplitude of the pressure signal is outside of a permissible range.

3. The method according to claim 2, further comprising determining the variable which characterizes the oscillation amplitude of the pressure signal from a difference between the pressure signal and a mean of the pressure signal.

4. The method according to claim 2, wherein the variable which characterizes the oscillation amplitude of the pressure signal includes a mean absolute value of a difference between the pressure signal and a mean of the pressure signal.

5. The method according to claim 2, further comprising recognizing an error if the variable which characterizes the oscillation amplitude of the pressure signal is smaller than a threshold value.

6. The method according to claim 5, wherein an error is recognized if the variable which characterizes the oscillation amplitude of the pressure signal is smaller than the threshold value for a first period of time.

7. The method according to claim 5, wherein an error is recognized if the variable which characterizes the oscillation amplitude of the pressure signal is smaller than the threshold value when there is a severe drop in the variable characterizing one of the exhaust-gas mass flow and the exhaust-gas volume flow for a first period of time.

8. The method according to claim 5, wherein the threshold value is specifiable depending on an operating state of at least one of an internal combustion engine and of the exhaust after-treatment system.

9. The method according to claim 8, wherein the threshold value is specifiable depending on at least one of a rotational speed and a quantity of fuel injected.

10. The method according to claim 1, further comprising recognizing an error if a rate of change of the pressure signal is less than a first threshold value when a rate of change of the variable characterizing one of the exhaust-gas mass flow and the exhaust-gas volume flow is above a second threshold value.

11. The method according to claim 10, further comprising recognizing an error if the rate of change of the pressure signal is greater than a third threshold value when the rate of change of the variable characterizing one of the exhaust-gas mass flow and the exhaust-gas volume flow is less than a fourth threshold value.

12. A device for changing an operational mode of an exhaust after-treatment system, comprising:
   a control unit configured to:
      monitor a pressure signal that characterizes at least one of a pressure at an input and output and a pressure differential between the input and output of the exhaust after-treatment system;
      decide whether to change the operational mode of the exhaust after-treatment system based on the monitored pressure signal, wherein the deciding includes recognizing errors in the pressure signal on a basis of:
         a first error diagnosis which evaluates an amplitude of oscillations in the pressure signal, and
         a second error diagnosis which evaluates a correspondence over time of the pressure signal and a variable characterizing one of an exhaust-gas mass flow and an exhaust-gas volume flow,
   wherein the exhaust after-treatment system is at least one of a particulate filter and a catalytic converter.

* * * * *